United States Patent [19]
Kornylo

[11] Patent Number: 5,571,355
[45] Date of Patent: Nov. 5, 1996

[54] METHOD OF MAKING A DOOR PANEL WITH INTEGRATED BOLSTER

[75] Inventor: Walter P. Kornylo, Livonia, Mich.

[73] Assignee: Atoma International Inc., Newmarket, Canada

[21] Appl. No.: 368,623

[22] Filed: Jan. 4, 1995

Related U.S. Application Data

[63] Continuation-in-part of Ser. No. 52,453, Apr. 26, 1993, abandoned.

[51] Int. Cl.$^6$ .............................. B32B 31/06; B32B 31/20
[52] U.S. Cl. .............................. 156/78; 156/79; 156/212; 156/214; 156/228; 156/245; 156/285; 156/321; 264/46.4; 264/511
[58] Field of Search .................................. 156/214, 245, 156/212, 285, 77, 79, 228, 242, 321, 78; 264/511, 46.4, 46.5, 46.6, 247, 257, 261, 263, 510

[56] References Cited

U.S. PATENT DOCUMENTS

| | | | |
|---|---|---|---|
| 4,243,456 | 1/1981 | Cesano | 156/214 |
| 4,740,417 | 4/1988 | Tornero | 156/222 |
| 4,766,025 | 8/1988 | Sanok et al. | 264/46.6 |
| 4,923,539 | 5/1990 | Spengler et al. | 156/212 |
| 5,053,179 | 10/1991 | Masui et al. | 264/257 |
| 5,091,031 | 2/1992 | Strapazzini | 156/212 |
| 5,236,534 | 8/1993 | Noguti et al. | 156/245 |

FOREIGN PATENT DOCUMENTS

| | | |
|---|---|---|
| 0211495 | 2/1987 | European Pat. Off. . |
| 0259810 | 3/1988 | European Pat. Off. . |
| 0275389 | 7/1988 | European Pat. Off. . |
| 0361740 | 4/1990 | European Pat. Off. . |
| 0411376 | 2/1991 | European Pat. Off. . |
| 0482270 | 4/1992 | European Pat. Off. . |
| 1517615 | 12/1992 | European Pat. Off. . |
| 60-048324 | 3/1985 | Japan ................................ 264/511 |
| 61-162317 | 7/1986 | Japan ................................ 264/511 |
| 61-297120 | 12/1986 | Japan ................................ 264/511 |
| 62-211126 | 9/1987 | Japan . |
| 63-078716 | 4/1988 | Japan ................................ 264/511 |
| 63-176132 | 7/1988 | Japan . |
| 63-159130 | 7/1988 | Japan ................................ 156/245 |

OTHER PUBLICATIONS

Patent Abstracts of Japan, vol. 10, No. 66 (M–461–2123) Mar. 1986 re JP-A 60 212313.
Patent Abstracts of Japan, vol. 10, No. 81 (M–465) (2138) Mar. 1986 re JP-A 60 222319.
Patent Abstracts of Japan, vol. 10, No. 33 (M–452) Aug. 1986 re JP-A 60 189432.

*Primary Examiner*—Michele K. Yoder
*Attorney, Agent, or Firm*—Cushman, Darby & Cushman

[57] ABSTRACT

A method of making an interior panel of an automotive vehicle door having an exterior surface which is to face toward the interior of the automotive vehicle when installed therein which comprises the steps of forming a bolster laminate including a textile outer layer, a flexible imperforate layer and an inner surface layer of a material which becomes tacky when heated, mounting the bolster laminate in a vacuum mold part, heating a sheet of predetermined material content presenting a vinyl surface, vacuum forming the heated sheet in the vacuum mold part so that the vinyl surface bondingly interengages the tacky material of the film inner layer of the bolster laminate, molding material between the vacuum mold part with the bolster laminate and the sheet therein and a cooperating opposed mold part to form an integrally molded panel having a content between an exterior bolster and vinyl surface and an opposed surface which includes a relatively hard substrate defining the opposed surface, a layer of sheet vinyl presenting the vinyl surface and a layer of relatively soft foamed material adjacent the layer of sheet vinyl.

18 Claims, 3 Drawing Sheets

METHOD OF MAKING A DOOR PANEL WITH INTEGRATED BOLSTER

This is a continuation-in-part application of application Ser. No. 08/052,453, filed Apr. 26, 1993, now abandoned, the entire contents of which is hereby incorporated by reference.

This invention relates to vehicle door panels and more particularly to improvements in methods for making vehicle door panels relating to the provision of bolsters on the surface thereof which face the interior of the vehicle when installed therein.

BACKGROUND OF THE INVENTION

There are two different methods for making panels herein contemplated, both of which result in a somewhat similar panel construction. The difference is that one method is capable of building into the panel more softness by including larger amounts of foamed material. Basically, this softer configuration is used in the more expensive luxury cars, whereas the other method is used basically in the large majority of other vehicles.

The method of making the luxury panel is essentially a two-stage process. In the first stage of the process, a substrate which is in the form of the panel is made by placing a fiberglass reinforcing mat in the lower half of a two-part mold and then filling the lower half of the mold with a foamable material such as liquid polyurethane capable of being cured into a foamed condition. After the foamable material has been inserted into the lower half of the mold, the upper half is moved down and then the foamable material is cured under heat to complete the substrate which is fairly rigid. In the second stage of the process, the substrate molded in the first stage is placed in the upper half of a second two-part mold. The lower part of the mold is in essence a vacuum mold. The second stage procedure is begun by moving a heated sheet of imperforate vinyl over the bottom part of the mold and then drawing by vacuum the heated sheet into the mold so that the three-dimensional configuration is formed on the vinyl. After the vinyl has been moved into engagement with the mold by the vacuum source, an amount of foamable material such as liquid polyurethane is then injected into the mold on top of the vinyl and thereafter the upper part of the mold which contains the substrate is then moved into cooperating relation with the lower part and the foamable material is cured into a relatively soft foamed condition.

The other more economical process is essentially a one-stage process which utilizes a two-part mold, the lower part of which again is a vacuum mold for the vinyl exterior sheet of the door panel to be made. In this case, the vinyl comes as the outer layer of a laminate which includes a layer of foamed material bounded thereto. The laminate is initially heated and then vacuum-drawn into the lower part of the mold. Next, a mat of fiberglass or similar reinforcing is placed inside the laminate vacuum adhered to the lower mold and, thereafter, a liquid polyurethane is added to the lower mold part over the vacuum-held laminate. The upper mold part is then closed and essentially a relatively rigid substrate is molded integrally with the vinyl laminate. In this process, it is not possible to provide much thickness and softness in the foam that is laminated with the vinyl or at least not as much as can be used in the second step of the two step process.

In the methods for making vehicle door panels herein contemplated, it has been the most widely accepted practice to make the door panels without bolsters and then add the bolsters to the panels after the vehicle panels have been made.

In both processes, the door panel that is made usually has a bolster added thereto in the area between the window sill portion and the arm rest portion and a rug section may be added to the lower portion below the arm rest portion. The bolster normally has a textile exterior mounted on a relatively rigid carrier. The bolster thus constructed must be adhered to the panel and must be edged in some fashion, often by a marginal trim strip or the like.

The addition of a bolster is so highly desirable from a decorative standpoint that the costs incident to its carrier construction and the necessity to adhere the bolster construction in place and to edge it somehow have generally been accepted. Nevertheless, there have been efforts undertaken to make the provision of one or more bolsters on a door panel more cost effective. Examples of various proposals are disclosed in the following U.S. Pat. Nos.: 4,740,417, 4,766,025, 4,923,539, and 5,091,031. Japanese patent publications 63-176132 and 62-211128 also provide examples.

The patent literature has suggested a procedure by which a trim insert is incorporated into the door panel during formation of the panel in a mold apparatus. For example, U.S. Pat. No. 4,923,539 discloses a molding method in which a textile insert is laminated onto a vinyl cover film with aid of nesting die. It is further disclosed that an adhesive is applied between the insert and the vinyl film to adheringly secure the vinyl to the insert. While a method of manufacturing a door panel in such fashion is more cost effective than the method in which an insert is added to the door panel after the panel has been made, the quality of the finished product and the cost-effectiveness of the method has been limited. More particularly, use of an unspecified adhesive to adhere the bolster material to the vinyl material may cause plasticizer migration between the vinyl and the adhesive, and resultant degradation of both. In addition, when an adhesive with a melting point which is too high is used, the adhesive will not be activated (become tacky) upon contact with the heated vinyl. If, on the other hand, the temperature activation range of the adhesive is too low, the adhesive may disintegrate before a temperature sufficient to soften vinyl and/or bolster material is reached. If the vinyl and/or bolster is not softened to the extent necessary, the desired amount of grain imprint therein will not be achieved, and part detail will be lost. Finally, if the thickness of the adhesive used is insufficient, the adhesive will not adequately perform its bonding function, nor will its imperforate nature be adequately employed to enable the porous textile outer layer of the bolster to be moved into conformity with a mold surface and retained therein by a vacuum communicated through openings in the mold surface. If the thickness of adhesive is greater than what is necessary, on the other hand, the expense associated with providing the adhesive will accordingly be unnecessarily high. Thus, there still exists a need to make the provision of a bolster on a door panel with optimized quality and cost-effectiveness.

SUMMARY OF THE INVENTION

It is an object of the present invention to fulfill the need expressed above. In accordance with the principles of the present invention, this objective is achieved by providing a method of making an interior panel of an automotive vehicle door having an exterior surface which is to face toward the interior of the automotive vehicle when installed therein which comprises the steps of forming a bolster laminate including a textile outer layer and a film inner layer which becomes tacky when heated provided by a polyurethane film of a thickness in the range of 2–4 mils and a melting point in the range of 220° F.–260° F., mounting the bolster laminate in a vacuum mold part having a mold surface shaped to define the exterior surface of the door panel with the outer layer engaging the mold surface, the thickness of the polyurethane film making the bolster laminate means sufficiently imperforate to enable the textile outer layer to be moved into conformity with the mold surface by application of a vacuum communicated through openings in the mold surface, heating a sheet of predetermined material content presenting a vinyl surface, vacuum forming the heated sheet in the vacuum mold part in such a way that the inner surface of the polyurethane film is raised to at least a temperature of 220° F. so as to be made tacky and that the vinyl surface bondingly interengages the vinyl surface of the heated sheet which engages a remaining portion of the mold surface of the vacuum mold part, and molding material between the vacuum mold part with the bolster laminate and the vinyl surface of the sheet engaged with the mold surface thereof and a cooperating opposed mold part to form an integrally molded panel having (1) an exterior surface in a shape corresponding with the shape of the mold surface of the vacuum mold part defined by the textile outer layer of the bolster laminate and the vinyl surface of the sheet other than the portion thereof bondingly interengaged with the bolster laminate, (2) an opposed surface of a shape corresponding in shape to a mold surface of the cooperating opposed mold part, and (3) a content between the exterior and opposed surfaces which includes a relatively hard substrate defining the opposed surface, a layer of sheet vinyl presenting the vinyl surface and a layer of relatively soft foamed material adjacent the layer of sheet vinyl. In this way, the costs heretofore encountered in constructing the bolster with a rigid carrier and of subsequently adhering the bolster construction to the finished panel are substantially reduced if not eliminated.

Preferably, the mold surface of the vacuum mold part on which the bolster laminate is mounted comprises a surface area bounded by a thin projecting peripheral lip having an interior surface extending from the surface area and an exterior surface from which the remaining mold surface extends. The bolster laminate is mounted on the mold surface area so that a marginal edge portion thereof lies along the interior surface of the peripheral lip. The vinyl surface which engages the exterior surface of the lip is biased by the relatively soft foamed material to abuttingly engage the marginal peripheral edge portion of the bolster laminate when removed from engagement with the lip after the molding procedure has been completed. In this way, the costs heretofore encountered in the edging of the bolster are substantially reduced if not eliminated.

DESCRIPTION OF THE PREFERRED EMBODIMENTS

Figure 1:
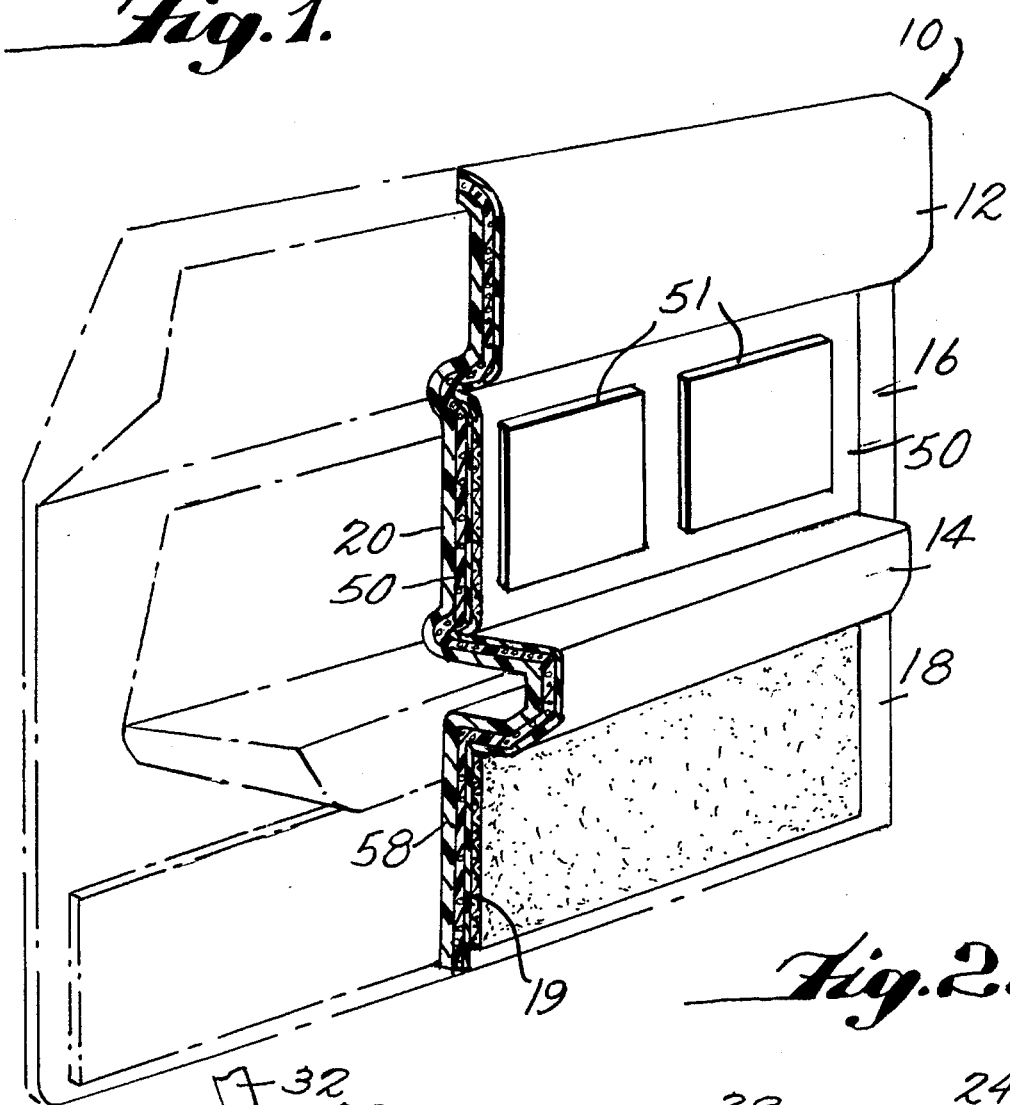
FIG. 1 is a perspective view of a completed vehicle door panel constructed in accordance with a two-stage method of the present invention.

Referring now more particularly to the drawings, there is shown in FIG. 1 a vehicle door panel, generally indicated at 10, made by a two-stage method according to the principles of the present invention. The door panel 10 includes a window sill upper portion 12 and an arm rest portion 14 defining therebetween a bolster receiving portion 16. A lower planar rug receiving portion 18 having a rug section 19 adhered thereto is disposed below the arm rest portion 14.

Various steps in the two-stage method of the present invention for making the panel are shown in FIGS. 2–5. The first stage is a substrate forming stage wherein a substrate 20 is made. It will be understood that in the broadest aspects of the present invention the first stage and second stage need not be performed continuously or at the same location. The substrate 20 made in the first stage is used in the second stage and hence the process of the second stage may merely acquire substrates from others.

Figure 2:
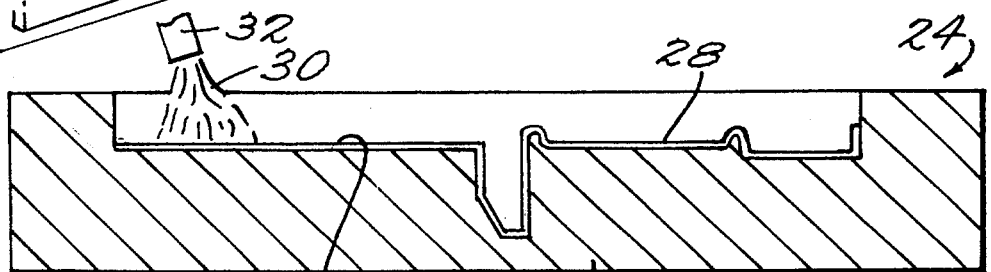
FIG. 2 is a sectional view of a lower substrate mold part illustrating a step in the substrate forming stage of the two-stage method.
Figure 3:
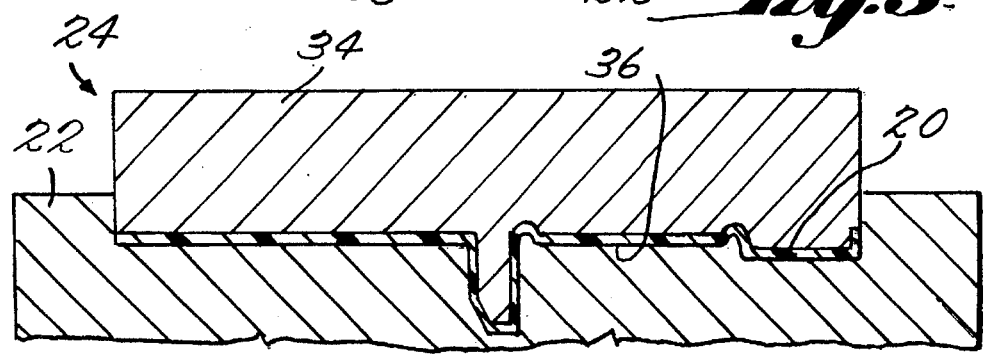
FIG. 3 is a sectional view of a substrate mold assembly including the lower part shown in FIG. 2 illustrating the completion of substrate forming stage of the two-stage method.

The substrate 20 may be formed in any known manner with any known material. Characteristically, the substrate 20 is a fairly rigid structure which may be formed of wood fiber or any of the known synthetic materials, such as polyethylene, polypropylene, polyvinyl chloride and polyurethane. FIGS. 2 and 3 illustrate steps in the formation of a substrate 20 utilizing polyurethane foam. As shown in FIG. 2, there is provided a lower mold part 22 of a substrate mold assembly, generally indicated at 24 in FIG. 3, which includes a mold surface 26 within which a fiberglass reinforcing mat 28 is mounted. Thereafter, a foamable polyurethane liquid material 30 is added to the reinforcing mat mounted within the mold surface 26. This addition is schematically illustrated by the feed pipe 32 in FIG. 2. After a full layer of foamable polyurethane material 30 has been added within the lower mold part 22, a cooperating upper mold part 34 of the substrate mold assembly 24 is moved downwardly into cooperating relation with the lower mold part 22 and the materials 28 and 30 mounted in the mold surface 26 thereof. The upper mold part 34 includes a downwardly facing mold surface 36 which is complementary to the shape of the interior surface of the finished panel 10. The interior surface of the panel is hidden within the door when the panel 10 is installed in the vehicle. The foamable polyurethane material 30 is then cured at a temperature within 300°–340° F. A typical thickness of the formed substrate 20 is approximately 3½ millimeters.

Figure 4:
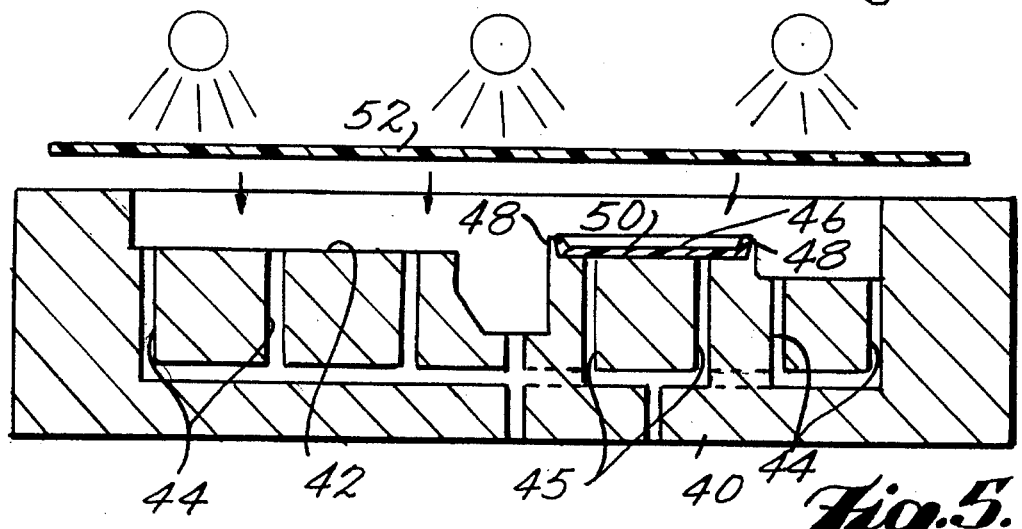
FIG. 4 is a sectional view of a vacuum mold part showing the beginning of the final molding stage of the two-stage method.
Figure 5:
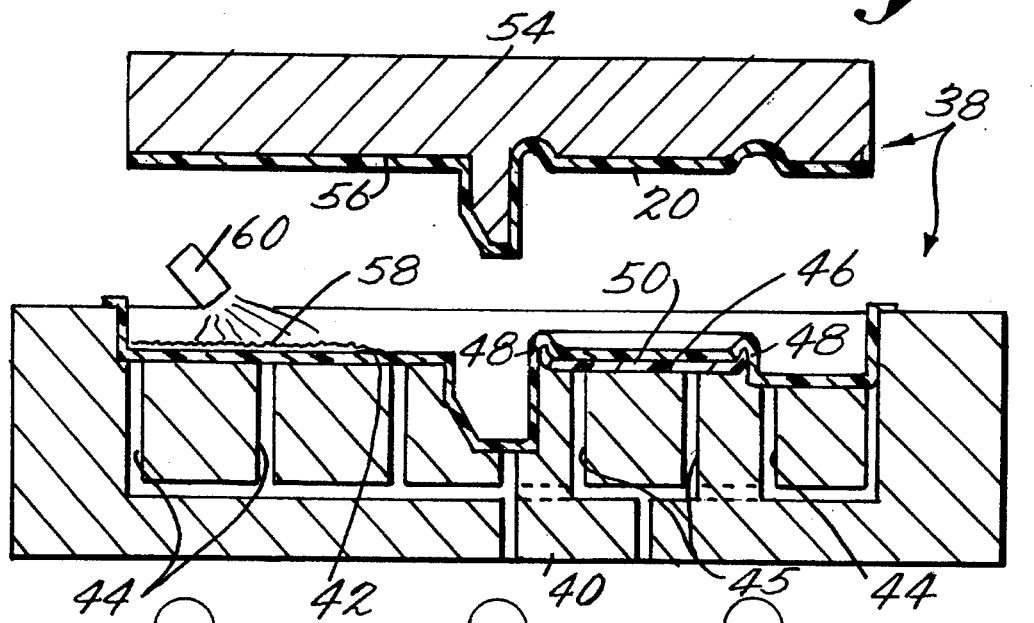
FIG. 5 is a sectional view of a final mold assembly including the vacuum mold part shown in FIG. 4 showing a further step of the final molding stage in the two-stage method.
Figure 6:
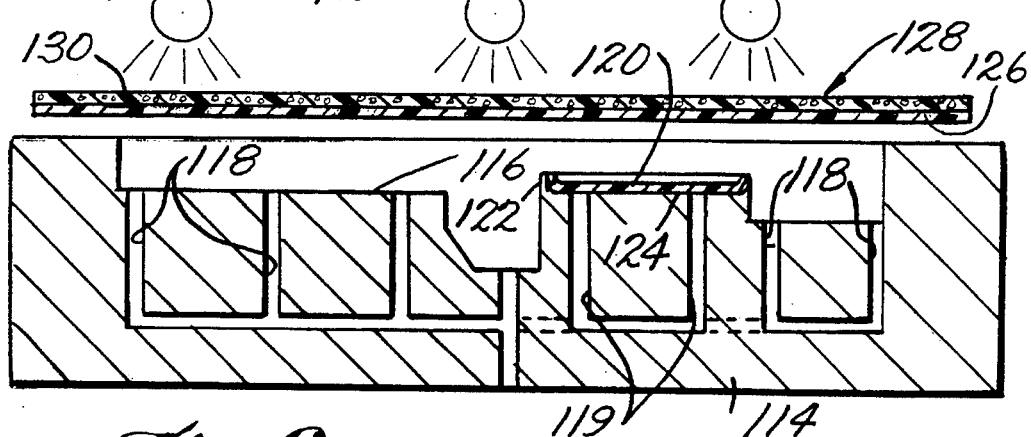
FIG. 6 is a sectional view of a vacuum mold part showing a step in a one-stage method according to the present invention.

The second stage of the process, as illustrated in FIGS. 4 and 5, is a final molding stage and involves the utilization of a final mold assembly, generally indicated at 38 in FIG. 5, which includes a lower mold component or part 40 which is of the vacuum-forming type. The lower mold part 40 is shown in FIG. 4 as including a mold surface 42 and two vacuum openings 44 and 45 extending therefrom to two suitable sources of vacuum (not shown). The mold surface 42 is shaped to provide essentially the exterior surface of the panel 10 which when the panel is mounted in a vehicle door faces the interior of the vehicle.

It will be noted that the mold surface 42 includes a bolster receiving portion 46 which is defined by a thin projecting peripheral lip 48. FIG. 4 illustrates the first step in the second final molding stage of the method and, in this initial step, a bolster laminate 50 is initially prepared for mounting on the portion 46 of the mold surface 42 defined by the peripheral lip 48. The bolster laminate 50 includes a textile outer layer. The textile outer layer may be of any suitable configuration and material as, for example, a knitted, woven, non-woven or otherwise formed textile fabric made from monofilaments and/or staple filaments of one textile material or of different textile materials including synthetic and natural materials such as cotton, wool, silk, linen, polyester, nylon, rayon, polyethylene, polypropylene, vinyl, and blends and mixtures thereof. In a preferred embodiment of the present invention, the textile layer is formed of a synthetic thermoplastic material, as for, example, polyester and the mold surface portion 46 has an appropriate design, such as the embossed squares 51, provided therein which can be imparted by molding under heat and pressure to the textile outer layer of thermoplastic material of the bolster laminate 50.

The bolster laminate 50 includes a flexible imperforate layer and an inner surface, each made from polyurethane which becomes tacky when heated by bringing a sheet of heated vinyl at a temperature of between 300° and 340° F. near and into contact therewith. While the polyurethane imperforate layer and surface may be provided by separate layers, preferably they are provided together in a single film structure. The polyurethane used for the bolster is to have a melting point in the range of 220°–260° F., and a thickness of the range of 2–4 mils. The polyurethane film performs both the function of rendering the porous textile outer layer capable of being moved into conformity with a mold surface and retained therein by a vacuum communicated through openings to the mold surface and the function of providing a normally non-tacky surface which is made tacky and bonds to the hot vinyl when brought near and into contact therewith.

The use of polyurethane film for an adhesive is advantageous because it does not cause plasticizer migration between the adhesive and the vinyl. As a result, degradation of the vinyl and adhesive is prevented. In addition, using a polyurethane film with a melting point in the range of 220°–260° F. is advantageous in that the film will become tacky when brought into contact with the heated vinyl at a temperature between 300° and 340° F., without the polyurethane film's being degraded, and while enabling a proper amount of vinyl and/or bolster softening to permit adequate grain imprint and part detail. In addition, the minimum thickness of about 2 mils is required to sufficiently enable the polyurethane film to achieve its bonding function, as well as its function of enabling the bolster to be moved into conformity with the mold surface. On the other hand, the upper limit of about 4 mils should not be exceeded in order to conserve material costs.

If desired, the bolster laminate 50 may also include an intermediate layer which preferably is of a foamed material. The foamed material is preferably relatively soft, as compared with the relatively hard foamed polyurethane forming the substrate 20, and may be of polypropylene, polyethylene, polyvinyl chloride, polyurethane or the like. Here again, a preferred material is polyurethane.

In the embodiment shown in FIG. 1, there is only a single unitary bolster laminate 50 utilized. However, it will be understood that more than one bolster laminate 50 may be utilized and may be positioned in the exterior surface of the door panel 10 in areas other than the bolster receiving portion 16 previously described.

As shown in FIG. 4, the first step in the second stage of the process is to mount the bolster laminate 50 in the bolster receiving portion 46 of the mold surface 42 of the vacuum mold part 40. The bolster laminate 50 is mounted so that the outer textile surface engages the mold surface portion 46 and a marginal edge portion of the bolster laminate 50 extends along the inwardly facing surface of the peripheral lip 48. It is noted that the second set of vacuum openings 45 communicate with the bolster receiving portion 46. The separate vacuum source is communicated with the openings 45 to draw the outer surface of the bolster laminate 50 into engagement with the mold surface portion 46 and retain it thereon.

Next, a sheet of vinyl 52 is provided which has a surface area sufficient to cover the mold surface 42 which turns upwardly along its periphery. A typical thickness for the vinyl sheet 52 is 1 millimeter. The vinyl sheet 52 is heated as, for example, to a temperature within the range of 300°–340° F. and then fed onto the mold surface 42 of the mold part 40 including onto the exposed inner surface of the bolster laminate 50. As the heated vinyl sheet 52 is drawn by the other vacuum source communicating with the vacuum openings 44 into conformity with the mold surface 42, the heat of the vinyl sheet 52 will likewise heat the inner surface of the bolster laminate 50 rendering the surface tacky. It has been found that, by simply applying the vacuum and drawing the heated vinyl sheet 52 into the mold surface 42, the interengagement of the heated vinyl sheet 50 with the tacky film surface of the bolster laminate 50 and the pressure that is applied between these two surfaces will effect a substantial intimate bond which does not require any further implementation. It will be understood that the tacky characteristic of the inner surface acts as an adhesive in effecting the intimate bond between the vinyl sheet 52 and bolster laminate 50. Moreover, it can be seen that, as the heated vinyl sheet 52 conforms to the portions of the mold surface 42 which are beyond the periphery of the bolster laminate 50, there will be a marginal edge surface thereof which contacts the exterior surface of the peripheral lip 48.

With the heated vinyl sheet 52 vacuum formed in the mold part 40, the substrate 20 which had been preformed in the first stage is mounted on a cooperating mold part 54 of the final mold assembly 38 as shown in FIG. 5. The mold part 54 has a mold surface 56 which conforms in shape with the mold surface 36 of the substrate mold part 34. The mold surface 56 is therefore complementary with the shape of the interior surface of the substrate 20 and the latter is mounted in the mold part 54 so that its interior surface engages the mold surface 56.

Next, a foamable material 58, which is preferably a foamable liquid polyurethane, is added, as indicated at 60 in FIG. 5, onto the surface of the vinyl sheet 52 which is opposite from the mold surface 42 of the vacuum mold part 40. When the foamable material 58 has been sufficiently distributed over the vacuum formed vinyl sheet in mold part 40, the upper cooperating mold part 54 with the substrate 20 adhered to the mold surface 56 thereof is then moved into cooperating relation with the lower mold part 40.

Thereafter, the foamable material 58 is foamed and cured under heat as, for example, within the range of 100° to 160° F., into a relatively soft foamed condition between the substrate 20 and the vacuum formed vinyl sheet 52 having the bolster laminate 50 intimately bonded to the exterior surface thereof.

The panel 10 thus molded is then removed from the mold assembly 38. In this regard, it will be noted that the marginal edge of the heated vinyl contacting the exterior surface of the lip 48 will be backed by foamed material 58. Consequently, as the panel is removed from contact with the mold surface 42 of the mold part, the spacing between the surface of the vinyl sheet 52 contacting the exterior of the lip 58 and the surface of the bolster laminate 50 contacting the interior of the lip 58 which are spaced apart by the presence of the lip 58 during molding will be biased by the foamed material backing the vinyl sheet into engagement with one another so that the edge of the bolster lamina which shows on the exterior surface of the panel 10 is well defined by the juncture between the interengaged marginal portions of the vinyl sheet 52 and bolster laminate 50. Moreover, the interengaged extent of the marginal portions is such that it is not essential to very accurately determine the exact position of the actual edge of the bolster laminate 50 since the exact position of the actual edge is hidden within the panel and does not show.

After the panel 10 is removed from the mold assembly 38, the rug section 19, when desired, can be adhered to the lower planar portion 18 of the panel 10 by any suitable adhesive.

Referring now more particularly to FIGS. 6–9, these figures illustrate the steps in a one-stage method according to the principles of the present invention for making a door panel similar to the door panel 10 previously described. The door panel without the added rug section 19 is shown in cross-section in FIG. 9 and designated by the reference numeral 110.

The one-stage method utilizes a mold assembly, generally indicated at 112, which is similar to the mold assembly 38 previously described. The mold assembly 112 includes a lower mold part or component 114, which, like the mold part 40, is a vacuum forming mold component having a mold surface 116 and two sets of vacuum openings 118 and 119 extending from the mold surface 116 to two separate sources of vacuum (not shown). The mold surface 116 like the mold surface 42 previously described includes a portion, indicated at 120, which is positioned to form the bolster receiving portion of the panel 110 and is communicated with the set of vacuum openings 119.

The bolster receiving mold surface portion 120, like the mold surface portion 46 previously described, is defined by an upstanding peripheral lip 122 similar to the lip 48 previously described. As before, a bolster laminate 124 is provided. The bolster laminate 124 is constructed in the manner previously described and is mounted so that its textile outer layer engages the mold surface portion 120 and a marginal edge portion thereof engages the peripheral lip 122. As before, communication of a source of vacuum with the set of vacuum openings 119 draws and maintains the outer surface of the bolster laminate 124 in engagement with mold surface portion 120.

It can be seen that the lower vacuum mold part 114 is thus prepared in a manner similar to the vacuum mold part 40 onto which the heated vinyl sheet 52 is formed. In the one-stage method embodiment, a vinyl sheet 126 is provided. However, it forms an outer layer of a laminated sheet, generally indicated at 128, which includes a layer of relatively soft foam material 130 bounded thereto which may be provided by many different materials as, for example, polypropylene, polyethylene, polyester, polyvinyl chloride, and polyurethane. A preferred embodiment is polyurethane. The intermediate layer 130 may have a thickness of, for example, 3½ millimeters.

Figure 7:
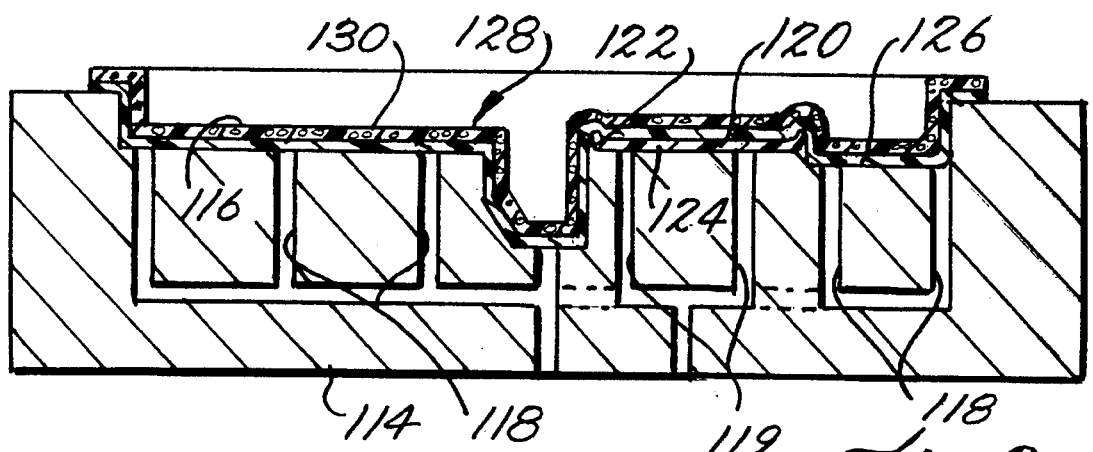
FIG. 7 is a sectional view similar to FIG. 6 showing the completion of the vacuum forming step of the one-stage second method.

As before, the laminated sheet 128 is heated to a temperature within the range of 300° to 340° F. and then vacuum formed onto the mold surface 116 and the inner layer of the bolster laminate 124 to intimately bond with the latter in the manner previously described. FIG. 7 illustrates the condition of the laminate sheet 128 after the vacuum forming step has been completed.

Figure 8:
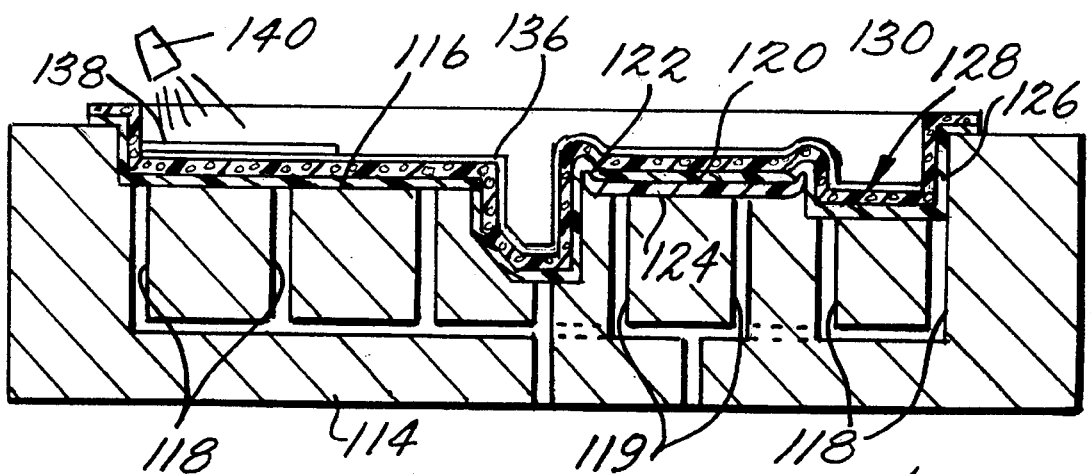
FIG. 8 is a sectional view similar to FIG. 7 showing the start of the substrate forming step of the one-stage method.
Figure 9:
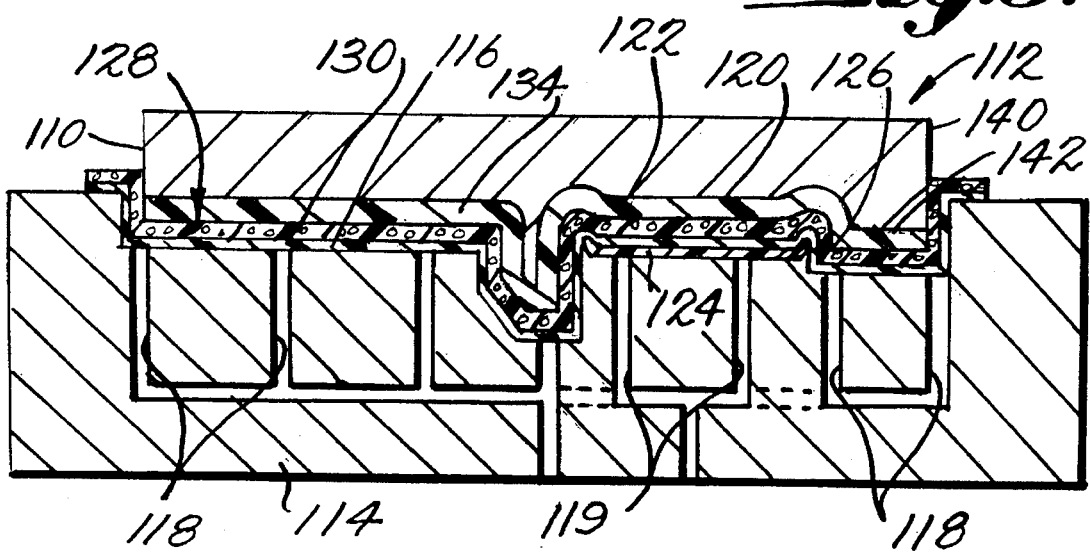
FIG. 9 is a sectional view of the mold assembly including the vacuum mold part shown in FIGS. 6, 7 and 8 showing the completion of the substrate forming step of the one-stage method.

The remaining steps of the one-stage method are steps which are taken to essentially mold a substrate 134 onto the exposed surface of the foamed material layer 130 of the laminate sheet 128 which is vacuum formed onto the lower mold part 112. FIG. 8 shows the preferred steps of forming the substrate 134 which includes the initial mounting of a fiberglass reinforcing mat 136 over the film surface and then adding a foamable material 138, preferably foamable polyurethane liquid, schematically illustrated at 140, in FIG. 8.

Once the polyurethane foamable material has been added within the mold part 114, a cooperating mold part or component 142 of the mold assembly 112 is moved into cooperating relation with the lower vacuum mold part 114. The mold part 140 has a mold surface 142 which is shaped to define the interior surface of the panel 110. Thereafter, the foamable polyurethane material 138 is foamed and cured under heat within the range of 100°–160° F. The curing results in a relatively rigid substrate 134 of foamed polyurethane with the fiberglass reinforcing mat embedded therein, similar to the starting substrate 20 made in the first stage of the two-stage method previously described.

It can be seen that the resultant panel 110 which is removed from the mold assembly 112 is similar to the panel 10 prior to the adherence of the rug section 19 thereto. The basic difference between the two panels is that the vinyl sheet 126 which forms the exterior surface of the panel 110, except for the exterior surface provided by the bolster laminate 124, is backed by a uniform thickness of soft foamed material 130 whereas, in the case of the panel 10, the soft foam material 58 may be thicker in areas where softness is particularly desired and need not be of uniform thickness. It will also be understood that the panel 110 can have a rug section 19 suitably adhered to the lower portion thereof in the same manner as the panel 10.

What is claimed is:

1. A method of making an interior panel of an automotive vehicle door having an exterior surface which is to face toward the interior of the automotive vehicle when installed therein which comprises the steps of providing a bolster laminate including a textile outer layer, a flexible imperforate layer having an inner surface which becomes tacky when heated wherein said inner surface is provided by a polyurethane film having a thickness in the range of 2–4 mils and a melting point in the range of 220° F.–260° F., mounting the bolster laminate in a vacuum mold part having a mold surface shaped to define the exterior surface of the door panel with the outer layer engaging the mold surface, said thickness of said polyurethane film making said bolster laminate sufficiently imperforate to enable the textile outer layer to be moved into conformity with the mold surface by application of a vacuum communicated through openings in the mold surface, heating a sheet of predetermined material content presenting a vinyl surface, vacuum forming the heated sheet in the vacuum mold part and bringing the heated sheet into contact with the inner surface of the polyurethane film so that the temperature of the inner surface of the polyurethane film is raised to at least 220° F. so as to be made tacky and to bondingly interengage the vinyl surface of the heated sheet which engages a remaining portion of the mold surface of said vacuum mold part, and molding material between said vacuum mold part with said bolster laminate and the vinyl surface of said sheet engaged with the mold surface thereof and a cooperating opposed mold part to form an integrally molded panel having (1) an exterior surface in a shape corresponding with the shape of the mold surface of said vacuum mold part defined by the textile outer layer of said bolster laminate and the vinyl surface of said sheet other than the portion thereof bondingly interengaged with said bolster laminate, (2) an opposed surface of a shape corresponding in shape to a mold surface of said cooperating opposed mold part, and (3) a content between the exterior and opposed surfaces which includes a relatively hard substrate defining the opposed surface, a layer of sheet vinyl presenting said vinyl surface and a layer of relatively soft foamed material adjacent said layer of sheet vinyl.

2. A method as defined in claim 1 wherein said bolster laminate includes an intermediate layer of foamed material between said textile outer layer and said polyurethane film.

3. A method as defined in claim 1 wherein said sheet comprises a laminate sheet including (1) an outer layer of vinyl sheet providing said vinyl surface and said layer of vinyl sheet in the content of the molded panel and (2) a layer of foamed material bonded to the layer of vinyl sheet providing said layer of relatively soft foamed material in the content of the molded panel and said substrate is molded into said relatively hard condition in said final molding procedure against the mold surface of said cooperating opposed mold part.

4. A method as defined in claim 3 wherein the molding of said substrate in the final molding procedure includes the steps of placing a preformed fiberglass reinforcing mat over the vacuum formed heated laminate sheet and adding a foamable polyurethane material to the preformed fiberglass mat after which the added foamable polyurethane material is heated and cured while said cooperating opposed mold part is in cooperating relation with said vacuum mold part so as to form said relatively hard substrate reinforced by said fiberglass mat and bonded to the tacky material of the inner film layer of said vacuum formed laminate sheet.

5. A method as defined in claim 4 wherein said bolster laminate comprises a single unitary bolster laminate, the mold surface of said vacuum mold part including a window sill portion defining the exterior surface of an upper window sill portion of the door panel, an arm rest portion spaced from said window sill portion defining the exterior surface of an arm rest portion of said door panel, and a planar portion adjacent said arm rest portion defining a lower planar portion of the door panel onto which a ruglike panel is adhered, the mold surface portion engaged by the textile outer layer of said bolster laminate being disposed between said window sill portion and said arm rest portion.

6. A method as defined in claim 5 wherein the mold surface of said vacuum mold part on which said bolster laminate is mounted comprises a surface area bounded by a thin projecting peripheral lip having an interior surface extending from said surface area and an exterior surface from which the remaining mold surface extends, said bolster laminate being mounted on said mold surface area so that a marginal edge portion thereof lies along the interior surface of said peripheral lip, the vinyl surface engaging the exterior surface of said lip being biased by the relatively soft foamed material to abuttingly engage the marginal peripheral edge portion of said bolster laminate when removed from engagement with said lip after the molding procedure has been completed.

7. A method as defined in claim 6 wherein the textile outer layer of said bolster laminate is made of thermoplastic material, the surface area bounded by said lip including a non-planar surface design which is imparted to the engaged surface of textile outer layer of said bolster laminate and retained therein by virtue of the thermoplastic nature of the material thereof.

8. A method as defined in claim 1 wherein said bolster laminate includes a layer of foamed material bonded to the textile outer layer.

9. A method as defined in claim 1 wherein said substrate is preformed in said relative hard condition with a surface which matches the mold surface of said cooperating opposed mold part and the final molding procedure is carried out with the matching surface of said preformed substrate engaged with the mold surface of said cooperating opposed mold part.

10. A method as defined in claim 9 wherein said preformed substrate is made by placing a preformed fiberglass reinforcing mat and foamable material in a preform mold and then curing the foamable material within the preform mold into said relatively hard condition reinforced by said mat.

11. A method as defined in claim 9 wherein said sheet which is heated comprises only a vinyl sheet providing said vinyl surface, the final molding procedure including the steps of pouring a foamable polyurethane material onto an opposite surface of the vacuum formed vinyl sheet and heating and curing the added foamable polyurethane material into said layer of relatively soft foamed material between the vacuum formed vinyl sheet and the preformed substrate.

12. A method as defined in claim 11 wherein said bolster laminate comprises a single unitary bolster laminate, the mold surface of said vacuum mold part including a window sill portion defining the exterior surface of an upper window sill portion of the door panel, an arm rest portion spaced from said window sill portion defining the exterior surface of an arm rest portion of said door panel, and a planar portion adjacent said arm rest portion defining a lower planar portion of the door panel onto which a ruglike panel is adhered, the mold surface portion engaged by the textile outer layer of said bolster laminate being disposed between said window sill portion and said arm rest portion.

13. A method as defined in claim 12 wherein the mold surface of said vacuum mold part on which said bolster laminate is mounted comprises a surface area bounded by a thin projecting peripheral lip having an interior surface extending from said surface area and an exterior surface from which the remaining mold surface extends, said bolster laminate being mounted on said mold surface area so that a marginal edge portion thereof lies along the interior surface of said peripheral lip, the vinyl surface engaging the exterior surface of said lip being biased by the relatively soft foamed material to abuttingly engage the marginal peripheral edge portion of said bolster laminate when removed from engagement with said lip after the molding procedure has been completed.

14. A method as defined in claim 13 wherein the textile outer layer of said bolster laminate is made of thermoplastic material, the surface area bounded by said lip including a non-planar surface design which is imparted to the engaged surface of textile outer layer of said bolster laminate and retained therein by virtue of the thermoplastic nature of the material thereof.

15. A method as defined in claim 11 wherein said bolster laminate includes a layer of foamed material bonded to said textile outer layer.

16. A method as defined in claim 1 wherein said bolster laminate comprises a single unitary bolster laminate, the mold surface of said vacuum mold part including a window sill portion defining the exterior surface of an upper window sill portion of the door panel, an arm rest portion spaced from said window sill portion defining the exterior surface of an arm rest portion of said door panel, and a planar portion adjacent said arm rest portion defining a lower planar portion of the door panel onto which a ruglike panel is adhered, the mold surface portion engaged by the textile outer layer of said bolster laminate being disposed between said window sill portion and said arm rest portion.

17. A method as defined in claim 16 wherein the mold surface of said vacuum mold part on which said bolster laminate is mounted comprises a surface area bounded by a thin projecting peripheral lip having an interior surface extending from said surface area and an exterior surface from which the remaining mold surface extends, said bolster laminate being mounted on said mold surface area so that a marginal edge portion thereof lies along the interior surface of said peripheral lip, the vinyl surface engaging the exterior surface of said lip being biased by the relatively soft foamed material to abuttingly engage the marginal peripheral edge portion of said bolster laminate when removed from engagement with said lip after the molding procedure has been completed.

18. A method as defined in claim 17 wherein the textile outer layer of said bolster laminate is made of thermoplastic material, the surface area bounded by said lip including a non-planar surface design which is imparted to the engaged surface of textile outer layer of said bolster laminate and retained therein by virtue of the thermoplastic nature of the material thereof.

\* \* \* \* \*